J. FOWLER.
Three-Horse Clevis.
No. 79,463.
Patented June 30, 1868.
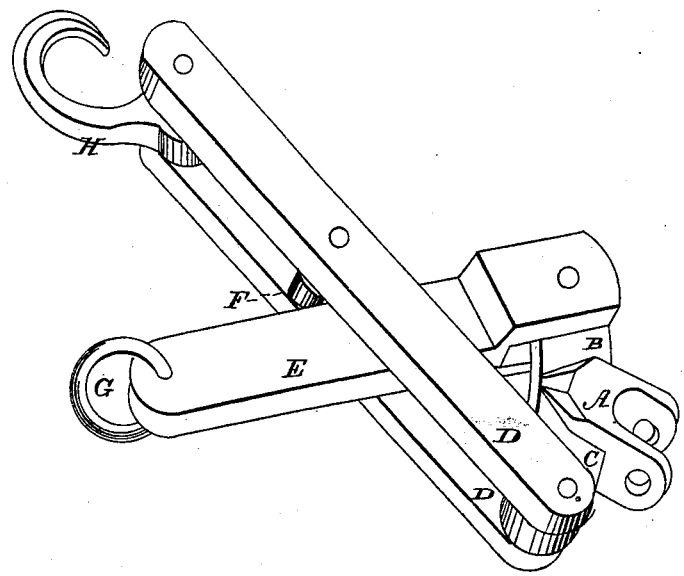

United States Patent Office.

JOSEPH FOWLER, OF ALLEGAN, MICHIGAN.

Letters Patent No. 79,463, dated June 30, 1868.

IMPROVEMENT IN THREE-HORSE CLEVISES.

The Schedule referred to in these Letters Patent and making part of the same.

TO WHOM IT MAY CONCERN:

Be it known that I, JOSEPH FOWLER, of Allegan, in the county of Allegan, and State of Michigan, have invented a new and useful Improvement in a Self-Adjusting Three-Horse Clevis; and I do declare that the following is a true and accurate description thereof, reference being had to the accompanying drawings, and to the letters of reference marked thereon, and being a part of this specification.

The object of this invention is so to construct a clevis that three horses can be attached to it in such a manner that the draught will be equal upon each of the horses.

In order to accomplish this object, I construct a clevis, A, of any suitable metal, cast or wrought, and provided with proper bolt-holes and bolt to attach it to a plow-beam, and also provided with two ears, B and C, to which are attached the bars D and the lever E, which are hinged or pivoted to the ears B and C.

The outer extremity of the bars D is fitted with a suitable hook, H, and between the bars, and about one-third the distance of their length from the hook, is hung the friction-wheel F.

The lever E is so arranged that it works between the bars D, and at an angle with the same, the angle varying with the relative strain upon the bars or lever, and is provided at its outer extremity with any suitable device, G, to which to attach the team.

I represents the end of a plow-beam.

In order to use this clevis, attach it to the plow-beam. Then attach two horses to the end of the lever E, and one horse (the centre one) to the end of the bars D, and the draught will be equal upon all three of the horses which are working abreast. Should the two horses attached to the lever E draw more than their proportion, it will elevate the outer end of the bars D by means of the friction-wheel F, and compel the one horse attached to it to do his share of the work.

What I claim as my invention, and desire to secure by Letters Patent, is—

1. The bars D and friction-wheel F, or its equivalent, in connection with any suitable clevis, A, when attached and operating substantially as and for the purposes specified.

2. The bar or lever E, when attached to the upper end of the clevis A, and provided with any suitable device, G, to which to attach a team, when constructed and operating substantially as and for the purposes set forth.

3. The combination and arrangement of the clevis A, the bars D D, the lever E, the friction-roller F, hook H, and ring G, or their equivalent, when constructed and operating substantially as and for the purposes herein described.

JOSEPH FOWLER.

Witnesses:
E. L. YAPLE,
O. T. FAST.